United States Patent Office 2,928,795
Patented Mar. 15, 1960

2,928,795

MOLDING COMPOSITION COMPRISING ETHYL CELLULOSE, EPOXY COMPOUND AND PHENOLIC COMPOUND AND PROCESS OF PREPARING

John S. Tinsley, New Brunswick, N.J., assignor to Hercules Powder Company, Wilmington, Del., a corporation of Delaware No Drawing. Application January 16, 1957
Serial No. 634,398

14 Claims. (Cl. 260—13)

This invention relates to the treatment of cellulose derivatives and to the resulting product. In a specific aspect this invention relates to the treatment of cellulose ethers and to the resulting cellulose ether compositions. In one of its more specific aspects this invention relates to a process for the color and viscosity stabilization of an alkyl cellulose and to the resulting stabilized composition.

Thermoplastic compositions based on ethyl cellulose and similar thermoplastic cellulose ethers have been found to be useful where the properties of toughness, dimensional stability, and flexibility are required. However, when such cellulose ethers have been molded into useful objects at high temperatures, a considerable discoloration of the cellulose ether composition takes place. Thus, compositions depositing a substantially colorless mass from solution have given relatively dark amber masses much like tortoise shell upon being molded under heat. In addition, there has been a considerable loss of viscosity, i.e., degradation, which leads to brittle molded products.

Some attempts have been made to improve the color of the cellulose ethers by treatment with various bleaching agents and by treatment with acids. Where such improvements in color have been rendered in the molding operation, they have usually resulted in such extreme loss of viscosity that a relatively useless product results. Consequently, it has not been possible to prepare clear colorless molded products of cellulose ethers or even to prepare molded cellulose ether articles in pale or pastel shades. Molded cellulose ether articles have, therefore, been made primarily in pigmented or dark colors.

Many stabilizers have been employed in ethyl cellulose formulations or similar alkyl cellulose compositions to improve viscosity and color stability. In some instances, an excellent viscosity is obtained at the expense of the color characteristics and in other instances an excellent color is obtained at the expense of the viscosity characteristics. For example, an ethyl cellulose composition having good color properties is obtained by bleaching the composition with a chlorite bleaching agent. The composition resulting from such a process has an excellent plastic color but it also has a poor viscosity stability. The viscosity stability can be improved somewhat by the addition of a phenolic stabilizer which is a known stabilizer for use in ethyl cellulose compositions. In view of the above discussion the need for an effective method of stabilizing cellulose ether compositions against discoloration and loss of viscosity is obvious.

It is an object of this invention to provide a novel method for producing improved cellulose ether compositions.

It is another object of this invention to provide a novel method for producing alkyl cellulose compositions of improved viscosity stability and color stability.

It is another object of this invention to provide a novel method for producing ethyl cellulose compositions of improved viscosity stability and color stability.

It is another object of this invention to provide improved alkyl cellulose compositions.

It is a further object of this invention to provide novel alkyl cellulose compositions of improved viscocity stability and color stability.

It is a further object of this invention to provide novel ethyl cellulose compositions of improved viscosity stability and color stability.

Further and additional objects of this invention will be apparent from the ensuing detailed disclosure.

In accordance with this invention it has been found that the color and viscosity stability of a cellulose ether composition can be markedly improved by incorporating in the composition a phenolic stabilizer and an epoxy resin composition containing at least one epoxy group. More specifically, it has been found that when these two types of stabilizers are used together a synergistic effect in improving said stability is obtained.

The advantages and utility of this invention are apparent from the following examples. In these examples the compositions are shown in parts by weight and the ethyl cellulose has an ethoxyl content of 46.6% and a viscosity of 67 c.p.s. The viscosities were measured in a 5% solution of an 80/20 toluene/ethanol mixture.

The epoxy stabilizers designated in Table 1 below arbitrarily as X, Y and Z are glycidyl ethers of Bisphenol A (P,P'-isopropylidenediphenol). They can be prepared by reacting epichlorohydrin with Bisphenol A. Their only material difference is in molecular weight. These stabilizers have approximate molecular weights of 525 for X, 400 for Y, and 380 for Z.

In each of the examples in Table 1 below the plastic composition was prepared by compounding the formulation on a two-roll mill (6 x 16" rolls at 24.5 and 18 r.p.m.) at roll temperatures of 280° and 310° F. In each example the plasticizer employed was styrene resin having a molecular weight of 260. The composition was milled for twenty minutes and then stripped from the rolls. A small sample was removed and the viscosity was determined. The remainder was then ground to approximately 16-mesh molding powder. A disk measuring 2.250" x .182" was formed by injection molding using a one-ounce injection molding machine. This unit was operated at a temperature of 410° F. at the discharge end of the cylinder and 400° F. at the feed end. The ram was set to deliver a pressure of 1200 p.s.i. Cycles of 30 and 120 seconds were employed (actual dwell time of plastic in heated cylinder). The color and viscosity were determined on both the 30- and 120-second cycle disks. The results were as shown in Table 1 below.

Table 1

| Example | Composition, Parts by Weight | | | | Properties | | |
|---|---|---|---|---|---|---|---|
| | Ethyl Cellulose | Plasti-cizer | Stabilizer | | Viscosity (cps.) | Percent Viscosity Retention (based on the flake) | Color (CSCS Units) |
| | | | Phenolic | Epoxy | | | |
| 1 | 100 | 20 | | | a 67.0<br>b 43.4<br>c 32.2<br>d 16.2 | <br>64.8<br>48.2<br>24.2 | <br><br>12.0<br>24.8 |
| 2 | 100 | 18 | 2 (Ditertiary amyl-phenol) | | a 67.0<br>b 61.0<br>c 45.6<br>d 38.2 | <br>91.8<br>68.1<br>51.1 | <br><br>13.2<br>13.4 |
| 3 | 100 | 18 | | 1 (X) | a 67.0<br>b 48.2<br>c 44.0<br>d 38.4 | <br>72.0<br>65.7<br>57.4 | <br><br>9.9<br>17.6 |
| 4 | 100 | 18 | 2 (Ditertiary amyl-phenol) | 1 (X) | a 67.0<br>b 64.6<br>c 53.6<br>d 54.4 | <br>96.4<br>80.1<br>81.2 | <br><br>12.4<br>14.4 |
| 5 | 100 | 18 | do | 0.1 (X) | a 67.0<br>b 61.0<br>c 55.4<br>d 44.8 | <br>91.0<br>82.7<br>67.0 | <br><br>9.2<br>10.3 |
| 6 | 100 | 18 | 2 (Octylphenol) | | a 67.0<br>b 57.0<br>c 45.4<br>d 24.2 | <br>85.2<br>67.8<br>36.2 | <br><br>10.0<br>14.4 |
| 7 | 100 | 18 | | 1 (Y) | a 67.0<br>b 48.6<br>c 47.6<br>d 41.8 | <br>72.6<br>71.1<br>62.5 | <br><br>13.6<br>19.8 |
| 8 | 100 | 18 | 2 (Octylphenol) | 1 (Y) | a 67.0<br>b 60.0<br>c 54.8<br>d 52.4 | <br>89.5<br>81.8<br>78.2 | <br><br>12.4<br>13.8 |
| 9 | 100 | 18 | do | 0.1 (Y) | a 67.0<br>b 59.0<br>c 55.2<br>d 51.0 | <br>88.0<br>82.5<br>76.2 | <br><br>10.4<br>12.4 |
| 10 | 100 | 18 | 2 (Ditertiary butyl p-cresol) | | a 67.0<br>b 60.2<br>c 58.8<br>d 29.2 | <br>89.8<br>87.8<br>43.6 | <br><br>12.4<br>17.8 |
| 11 | 100 | 18 | | 1 (Z) | a 67.0<br>b 42.6<br>c 36.6<br>d 33.0 | <br>63.7<br>54.7<br>49.3 | <br><br>12.8<br>14.4 |
| 12 | 100 | 18 | 2 (Ditertiary butyl p-cresol) | 1 (Z) | a 67.0<br>b 63.8<br>c 58.2<br>d 57.8 | <br>95.3<br>86.9<br>86.4 | <br><br>13.2<br>12.6 |
| 13 | 100 | 18 | do | 0.1 (Z) | a 67.0<br>b 61.2<br>c 52.0<br>d 50.2 | <br>91.5<br>77.7<br>75.0 | <br><br>11.6<br>13.6 | a Flake.
b Molding powder.
c 30-sec. cycle.
d 120-sec. cycle.

The cellulose ethers that are employed in practicing this invention are organic solvent-soluble, i.e., they are soluble in any of the common organic solvents such as acetone, benzene, toluene-alcohol, methanol, ethanol, ethyl acetate, butyl acetate, and the like. The primary factor that determines whether or not a cellulose ether is organic solvent-soluble is the degree of substitution of the cellulose ether and the extent of etherification necessary to produce an organic solvent-soluble cellulose is known to those skilled in the art. For example, ethyl cellulose having an ethoxyl content between about 37% and about 52%, preferably between about 43% and about 48% and having a viscosity of at least 20 c.p.s. is particularly suitable. One method of preparing such an ethyl cellulose involves the preparation of an alkali cellulose by contacting the cellulosic material with strong caustic. The resulting alkali cellulose is treated in an autoclave under pressure with an excess of ethyl chloride and the resulting mixture is then distilled to remove ether and alcohol by-products as well as unreacted ethyl chloride. The resulting cellulose ether is then water washed. In addition to ethyl cellulose, other cellulose ethers can be treated in accordance with this invention. For example, the process is applicable to propyl cellulose, ethyl propyl cellulose, ethyl butyl cellulose, methyl ethyl cellulose, benzyl cellulose, and the like.

The ethyl cellulose resulting from the above-described method of preparation is of the high combined ash type, i.e., a high percentage or substantially all of the hydrogen atoms in the carboxyl radicals of the ethyl cellulose have been replaced by sodium atoms. These carboxyl radicals may be formed either during the etherification of the cellulose or during the after-treatment of the ethyl cellulose, and the carboxyl radicals are attached to the cellulose chain. This invention can be employed to improve the viscosity stability of high combined ash ethyl cellulose. However, if an ethyl cellulose of good color stability as well as good viscosity stability is desired, it is necessary to employ an ethyl cellulose of the low combined ash type, i.e., an ethyl cellulose wherein a substantial portion of the sodium atoms have been replaced by hydrogen atoms. Low combined ash ethyl cellulose can be produced by steeping high combined ash ethyl cellulose in an aqueous solution of a mineral acid, such as hydrochloric acid, and thus replacing sodium atoms with hydrogen atoms. To produce a color-stable ethyl cellulose in accordance with this invention a low combined ash ethyl cellulose having a neutralization within the range of 20% to 30%, preferably not above 25%, is employed. This neutralization can be defined as the ratio of the total number of sodium atoms on the carboxyl groups to the total number of replaceable hydrogen atoms in all the carboxyl groups on the ethyl cellulose when completely deashed. In the above examples the ethyl cellulose had a neutralization of 6% and a combined ash content of 0.02% calculated as sodium carbonate, and this ethyl cellulose had been prepared by bleaching and deashing a high combined ash ethyl cellulose with sodium chlorite in an aqueous acidic medium. The problem of stabilizing deashed ethyl cellulose is particularly difficult since the oxidative degradation of ethyl cellulose is autocatalytic and acid catalyzed, even by acid groups as weak as the carboxyls attached to the ethyl cellulose chain.

In addition to the alkyl and aralkyl cellulose ethers described above, the invention is generally applicable to organic solvent-soluble cellulose ethers. For example, ethyl hydroxyethyl cellulose can be treated in accordance with this invention. Also, ether-ester derivatives of cellulose can be similarly treated, but in these ether-ester derivatives, the ether grouping is the dominant substitution and the ester grouping is present in a minor amount. However, the degree of substitution of the ether-ester derivative is such that the derivative is soluble in the organic solvents named above. It will be understood that the term "cellulose ether" as employed throughout the specification and claims includes ether-ester derivatives of cellulose wherein the ether grouping is the dominant substitution as well as unesterified cellulose ethers.

Various phenolic stabilizers can be used to effect the desired stabilization of the cellulose ethers. Among these stabilizers are p-sec-amylphenol, di-sec-amylphenol, o-sec-amylphenol, octylphenol, p-cyclohexylphenol, diisobutylphenol, p-tert-amylphenol, menthylphenol, tert-butyl-p-cresol, methylene bis(tert-butyl-p-cresol), methylene bis-p-cresol, di(hydroxy methyl phenyl) methyl p-cresol, and the like. The preferred phenolic stabilizers are the alkyl phenols and the most preferred stabilizer is diamylphenol. The amount of phenolic stabilizer that is employed in the cellulose ether composition is variable and dependent upon the amount of stabilization desired and the actual stabilizer employed. In most instances, the final product of this invention will contain from 1% to 3% by weight of phenolic stabilizer based on the cellulose ether. Various methods can be employed for incorporating the phenolic stabilizer in the cellulose ether composition. One such method involves adding from 0.5% to 1% by weight of phenolic stabilizer based on the cellulose ether to the final wash water employed to wash the cellulose ethers, such as ethyl cellulose, after the cellulose has been subjected to the etherification reaction. Alternatively, a solution or dispersion of the phenolic stabilizer can be added to the cellulose ether after it has undergone its final washing step. Prior to using the cellulose ether in a molding operation, it is preferred to add additional quantities of phenolic stabilizer in order to prevent oxidation or depolymerization of the ether. The additional quantity of phenolic stabilizer is such that the final product contains no more than 3% by weight of phenolic stabilizer based on the cellulose ether.

In general, any known nonvolatile epoxy-type compound compatible with the plastic composition can be employed to stabilize the cellulose ether composition. The epoxy-type compound is high boiling and of only low volatility at the compounding or molding temperature of the plastic composition. Actually, the epoxy-type compound has a boiling point substantially above the temperature employed in compounding or molding the plastic composition. The term "epoxy-type compound" is intended to mean an organic compound containing at least one epoxy group or oxirane ring and containing no other atoms than carbon, hydrogen, and oxygen. Epoxy-type compounds that can be used are epoxidized fatty oils, for example, peanut oil, corn oil, cottonseed oil, soybean oil, and the like. Epoxy-type resin condensation products of glycidol and bisphenol and, if desired, a compound such as epiphenylin (glycidyl phenyl ether) can be used. However, it is preferred not to employ this latter compound because of its toxic nature. Epoxy compounds that are suitable and can be used are resin condensation products of a bisphenol and an epihalohydrin, such as epichlorohydrin. The resins resulting from the condensation reaction contain epoxy groups and they are suitable for this invention. A suitable procedure for preparing these resins involves the interaction of an epihalohydrin, such as epichlorohydrin, and a bisphenol in equimolar proportions in the presence of an aqueous caustic solution. Moderate temperatures can be used to effect the reaction and in some instances slightly elevated temperatures are employed.

Polyglycidol is another epoxy-type compound suitable for this invention and it can be prepared by the polymerization or condensation of glycidol. One method of preparation involves the heating of glycidol at an elevated temperature, for example, 100° C. for an extended period of time sufficient to effect the desired condensation. Polyglycidol can also be prepared by polymerizing glycidol at lower temperatures with the aid of condensing agents, e.g., by treatment with stannic chloride at −25° C.

To be effective in most molding operations the epoxy-type compound should have a boiling point in excess of about 350° F., which is a common minimum molding temperature. Preferably the epoxy-type compound should have a boiling point in excess of 350° F. and preferably not lower than 400° F. It will be apparent that epoxy-type compounds having a lower boiling point can be used, but such compounds or resins are not preferred for effecting the desired heat stabilization.

The epoxy-type compound can be added to the cellulose ether composition by various methods. A suitable method involves the addition of the epoxy-type compound in the form of an aqueous emulsion to the water-washed cellulose ether recovered from the etherification procedure. In an alternative method, the epoxy-type compound can be incorporated in the cellulose ether composition during the compounding of the composition into a molding powder. Other methods of addition within the scope of this invention will be apparent to those skilled in the art.

The amount of epoxy-type compound that is employed is variable and dependent upon such factors as the degree of heat stability desired in the plastic composition, the actual epoxy-type compound that is employed, the manner in which the plastic composition is to be fabricated or processed, the color and viscosity desired for the final product, and the like. In the above examples, it has been shown that proportions of epoxy-type compound within the range of 0.1 to 1 part by weight per 100 parts of cellulose ether can be used effectively. In some instances, smaller amounts, for example, 0.05 part of an epoxy-type compound per 100 parts of cellulose ether can be used and, if desired, greater amounts than the maximum weight set forth above are also effective. However, for most compositions it is preferred not to exceed the addition of one part of epoxy-type compound per 100 parts of cellulose ether for economic reasons. Also, many of the epoxy resins are dark in color and they contribute an undesirable color to the final product if employed in an excessively large amount.

The foregoing examples clearly show that when the phenolic and epoxy-type stabilizers are both employed in the same cellulose ether composition, the viscosity and color stabilization that is obtained is markedly greater than the stabilization effects obtained when either type of stabilizer is employed alone. Thus, the data substantiate the fact that the combination of a phenolic and epoxy-type stabilizer in a cellulose ether composition has a synergistic effect in the viscosity and color stabilization of the cellulose ether composition. This synergistic effect was obtained in all of the above examples where a phenolic and epoxy-type stabilizer were employed together regardless of the amount of epoxy-type stabilizer that was used.

The examples show the excellent viscosity and color stability that can be obtained in a cellulose ether composition for use in an injection molding operation at an elevated temperature. The compositions resulting from the practice of this invention are not limited to those that can be employed in injection molding procedures. Additionally, suitable compositions can be formulated for use in hot-melt extrusion procedures, organosols, plastisols, hydrosols, and the like. It has been found that this invention is particularly adaptable for use in making plastic peel formulations containing a cellulose ether such as ethyl cellulose. In such a plastic peel formulation, the presence of the phenolic and epoxy-type stabilizers has the desirable effect of not only improving upon the viscosity and color stability of the formulation, but also of improving upon the tensile strength and elongation of the composition, both before and after aging at an elevated temperature for an extended period of time. A suitable plastic peel formulation contains:

| Component: | Parts by weight |
| --- | --- |
| Ethyl cellulose | 27 |
| Paraffin wax | 1 |
| Butylphenol | 1 |
| Raw castor oil | 5.6 |
| White refined mineral oil | 64.4 |
| Epoxy-type stabilizer | 1 |

In addition to the cellulose ether, phenolic and epoxy-type stabilizers described above, the compositions of this invention also contain any of the well-known plasticizers, resins, waxes, pigmenting or coloring materials, and the like, that are used in and compatible with cellulose ether formulations.

In the above examples the color properties of the ethyl cellulose were measured with a photoelectric filter photometer similar to that described by R. H. Osborn in U.S. 2,382,436. The color measurements are expressed in "cellulose products standard color scale (CSCS)" units. With this measuring device, the color of air is zero and the ethyl cellulose samples having the lowest color index are the most desirable.

From the above disclosure, numerous modifications of the invention within its spirit and scope will be apparent to those skilled in the art.

This application is a continuation-in-part of my copending application, Serial No. 298,613, filed July 12, 1952.

What I claim and desire to protect by Letters Patent is:

1. In a process of improving the viscosity and color stability of an organo-soluble cellulose ether molding composition, the improvement which comprises incorporating in said composition a phenolic compound and an epoxy compound as stabilizer for said cellulose ether, the amount of phenolic and epoxy stabilizer being 0.5% to 3% and 0.05% to 1% respectively by weight based on said cellulose ether, the phenolic stabilizer being selected from the group consisting of alkyl phenols, p-cyclohexylphenol, menthylphenol, methylene bis(tert-butyl-p-cresol), methylene bis-p-cresol, and di(hydroxy methyl phenol) methyl p-cresol, and the epoxy stabilizer being selected from the group consisting of epoxidized fatty oils, polyglycidol and glycidyl ethers of bisphenol.

2. The process of claim 1 wherein the phenolic stabilizer is di-tert-amylphenol and the epoxy stabilizer is a glycidyl ether of bisphenol.

3. The process of claim 1 wherein the phenolic stabilizer is di-tret-amylphenol and the epoxy stabilizer is a glycidyl ether of bisphenol.

4. The process of claim 1 wherein the phenolic stabilizer is octyl phenol and the epoxy stabilizer is a glycidyl ether of bisphenol.

5. The process of claim 1 wherein the phenolic stabilizer is butyl-p-cresol and the epoxy stabilizer is a glycidyl ether of bisphenol.

6. The process of claim 1 wherein the phenolic stabilizer is di-tert-amylphenol and the epoxy stabilizer is polyglycidol.

7. The process of claim 1 wherein the organo-soluble cellulose ether is deashed ethyl cellulose and the amount of phenolic and epoxy stabilizer is 1% to 3% and 0.1% to 1%, respectively.

8. A molding composition having improved stability of viscosity and color, comprising an organo-soluble cellulose ether, a phenolic compound and an epoxy compound as stabilizer for said cellulose ether, the amount of phenolic and epoxy stabilizer being 0.5% to 3% and 0.05% to 1% repsectively by weight based on said cellulose ether, the phenolic stabilizer being selected from the group consisting of alkyl phenols, p-cyclohexylphenol, menthylphenol, methylene bis(tert-butyl-p-cresol), methylene bis-p-cresol, and di(hydroxy methyl phenyl) methyl p-cresol, and the epoxy stabilizer being selected from the group consisting of epoxidized fatty oils, glycidyl ethers of bisphenol, and polyglycidol.

9. The molding composition of claim 8 wherein the phenolic stabilizer is an alkyl phenol and the epoxy stabilizer is a glycidyl ether of bisphenol.

10. The molding composition of claim 8 wherein the phenolic stabilizer is di-tert-amylphenol and the epoxy stabilizer is a glycidyl ether of bisphenol.

11. The molding composition of claim 8 wherein the phenolic stabilizer is octyl phenol and the epoxy stabilizer is a glycidyl ether of bisphenol.

12. The molding composition of claim 8 wherein the phenolic stabilizer is butyl-p-cresol and the epoxy stabilizer is a glycidyl ether of bisphenol.

13. The molding composition of claim 8 wherein the phenolic stabilizer is di-tert-amylphenol and the epoxy stabilizer is polyglycidol.

14. The molding composition of claim 8 wherein the orango-soluble cellulose ether is deashed ethyl cellulose and the amount of phenolic and epoxy stabilizer is 1% to 3% and 0.1% to 1%, respectively.

References Cited in the file of this patent

UNITED STATES PATENTS

| 2,710,844 | Thompson | June 14, 1955 |
| 2,746,958 | Pyle | May 22, 1956 |

UNITED STATES PATENT OFFICE

CERTIFICATE OF CORRECTION

Patent No. 2,928,795                                  March 15, 1960

John S. Tinsley

It is hereby certified that error appears in the printed specification of the above numbered patent requiring correction and that the said Letters Patent should read as corrected below.

Column 2, line 15, for "viscocity" read -- viscosity --; column 8, line 5, for "di-tert-amylphenol" read -- an alkyl phenol --; line 8, for "di-tret-amylphenol" read -- di-tert-amylphenol --; line 28, for "repsectively" read -- respectively --; line 52, for "orango-soluble" read -- organo-soluble --.

Signed and sealed this 13th day of September 1960.

(SEAL)
.ttest:

.KARL H. AXLINE                                  ROBERT C. WATSON
.ttesting Officer                                 Commissioner of Patents